United States Patent [19]

Merlo

[11] Patent Number: 4,468,956
[45] Date of Patent: Sep. 4, 1984

[54] METHOD AND APPARATUS FOR UTILIZING MICROWAVES FOR INTERNAL COMBUSTION ENGINE DIAGNOSTICS

[76] Inventor: Angelo L. Merlo, 2115 E. Long Lake Rd., Troy, Mich. 48098

[21] Appl. No.: 436,872

[22] Filed: Oct. 26, 1982

[51] Int. Cl.³ .................................... G01M 15/00
[52] U.S. Cl. ........................... 73/117.3; 73/119 R; 73/120
[58] Field of Search ............ 73/116, 117.3, 35; 364/551; 333/260, 245, 248; 123/414, 416, 417

[56] References Cited

U.S. PATENT DOCUMENTS

| | | | |
|---|---|---|---|
| 3,589,177 | 6/1970 | Merlo | 73/116 |
| 3,703,825 | 11/1972 | Merlo | 73/116 |
| 4,331,029 | 5/1982 | Wilson | 73/117.3 |
| 4,384,480 | 5/1983 | Krage | 73/117.3 X |

Primary Examiner—Jerry W. Myracle
Assistant Examiner—E. G. Harding

[57] ABSTRACT

A method and apparatus is disclosed for determining various diagnostic conditions of an internal combustion engine from an analysis of the resonances of a reflected microwave signal radiated into a combustion chamber of the internal combustion engine. Various parameters of each microwave resonance are calculated including: (1) the location of the resonance with respect to the crank angle of a crankshaft of the engine; (2) the peak-to-peak amplitude of the resonance; (3) the slope of the resonance; (4) the quality factor or "Q" of the resonance; and (5) the symmetry of parameters 1 through 4 with respect to turnaround points of the piston in the cylinder of the engine. The calculated parameters are thereafter correlated with reference parameters to determine the particular diagnostic condition.

46 Claims, 10 Drawing Figures

METHOD AND APPARATUS FOR UTILIZING MICROWAVES FOR INTERNAL COMBUSTION ENGINE DIAGNOSTICS

TECHNICAL FIELD

This invention relates to a method and apparatus for providing diagnostic information for internal combustion engines and, in particular, relates to method and apparatus for providing diagnostic information for internal combustion engines through the analysis of a reflected microwave signal introduced into the combustion chamber of the internal combustion engine.

BACKGROUND ART

In the early days of radio communications there was a need for portable frequency measuring standards for transmitters. Resonating cylinders with movable end plungers were employed to perform this function. The end plunger was connected to a lead screw having a very fine thread similar to that used in a micrometer barrel. The micrometer barrel was calibrated directly in frequency. Some barrels were carefully designed to show variation in resonance frequency of one part in 10,000.

The method of making a measurement of frequency was to introduce some of the transmitter energy into the variable cylinder system. The screw would be turned to move the end plate until a resonance in the cylinder could be detected at a detector also coupled to the cylinder. The detector was usually a point contact whisker into a silicon crystal and its detected current was used to deflect the needle of a microammeter. The microammeter current would dip when a resonance was excited. A pointer on the barrel would show the frequency of the source.

The cylinder of an internal combustion engine with a moving piston is an ordinary case of a cylindrical microwave resonanter having a variable cylinder height. This height is related to the crank angle of the crankshaft of the engine through a simple trigometric function of this angle.

The concept of employing microwave energy in order to study the internal workings of a cylinder of an internal combustion engine is disclosed in the Merlo U.S. Pat. Nos. 3,589,177 and 3,703,825,(each of which is hereby specifically incorporated by reference) and the paper of Merlo entitled "Combustion Chamber Investigations By Means of Microwave Resonances", in IEEE Transactions on Industrial Electronics and Control Instrumentation, April 1970, Volume 1ECI-17, No. 2. The above-mentioned United States patents and the paper disclose the use of microwave energy in the combustion chamber of an engine as a diagnostic tool. A spark plug was modified to serve the function of a microwave probe. Radio energy was transmitted into and received from the cylinder while the engine was operating. Strong absorption of the input energy occurred at various times during the cycle. Strong symmetry was present in the microwave signal during the various strokes of the engine.

In the paper of W. G. Rado entitled "Characteristics of a Plasma Generated by Combustion in a Spark Ignition Engine", in the Journal of Applied Physics, Vol. 46, No. 6, dated June, 1975, the author performed bulk absorption measurements at microwave frequencies on a plasma generated by the combustion in a spark ignition engine. From these measurements the author estimated the charge concentration and characteristics of the space-charge region formed around the plasma probe.

In the paper of J. H. Lienesch and M. K. Kragge entitled "Using Microwaves to Phase Cylinder Pressure to Crankshaft Position", SAE Paper 790103, dated Mar. 2, 1979, the authors describe a phasing technique which involves the transmission of microwave energy through a sparkplug hole and into the cylinder of a motored engine. The authors observed the microwave resonances which were symmetric about a minimum volume of piston position. Resonances were recorded on an oscilloscope screen along with one degree pulses generated by the crankshaft.

The Wilson U.S. Pat. No. 4,331,029 discloses a method and apparatus for measuring the ignition timing of an internal combustion engine wherein angular position of the engine crankshaft is monitored while microwave radiation is injected into a selected engine cylinder. The angular position of the engine crankshaft at an apparent top dead center position of the piston in a selected cylinder is identified as a function of microwave resonances within the cylinder. The angle of piston top dead center position is then compared with an event corresponding with ignition of the selected cylinder to determine the ignition angle relative to the piston top dead center position.

Many of the ideas and concepts disclosed and claimed herein are described in the papers of Merlo entitled "Microwave Signal Analysis For Engine Diagnostics" Midcon/81 Professional Program Session Record #4 Vehicle Diagnostics; and "Detection of Missing Bearing Clips Using Microwave Resonances" SAE Paper 820484, dated Feb. 22, 1982, both papers of which are hereby incorporated by reference.

DISCLOSURE OF THE INVENTION

An object of the present invention is to provide an improved method and apparatus for processing and subsequently correlating a detected, reflected microwave signal with a particular fault or diagnostic condition of an internal combustion engine.

An analysis of the detected microwave signal requires an understanding of the excitation of various microwave resonances within the cylinder of an internal combustion engine. For example, two types of modes of resonance can be excited in a cylinder, namely, the TE and TM modes of resonance. A mode of resonance is the frequency at which an integral number of standing waves build up as a result of reflections of energy bouncing around within the enclosure. There can be an infinite number of frequencies to satisfy this definition. However, as the exciting frequency of the energy becomes lower and lower, fewer and fewer modes satisfy this condition. Reduction in the exciting frequency produces longer and longer wave lengths, the dimensions of which approach the dimensions of the enclosure.

A particular mode of resonance (either TE or TM) is identified by the number of half-wave variations of the standing wave pattern of the electric field along the three coordinates of an XYZ coordinate system having its Z axis down the axis of the cylinder. The symbols TE and TM corresponding to transverse electric and transverse magnetic fields (characteristic of the standing wave pattern during resonance) are given subscripts of three decimal numbers representing the number of half wave variations along each coordinate. The symbol $TE_{111}$ represents a TE mode with one-half wave variation in each coordinate. The $TE_{111}$ mode is the lowest practical mode that will excite a cylinder into microwave resonance. In a typical combustion chamber not only the first order $TE_{111}$ mode is excited but typically also higher order modes may be excited as high as perhaps five, represented symbolically by $TE_{115}$. Increasing periods of the same mode appear as the piston moves down in the cylinder.

Another object of this invention is to provide an improved method and apparatus to detect shifts in parameters in data obtained from a computer-processed, reflected microwave signal and to correlate the detected shifts with a particular diagnostic condition.

In carrying out the above objects and other objects of this invention a preferred method for providing diagnostic information relating to a diagnostic condition in a multiple stroke, internal combustion engine having a crankshaft which rotates in response to motion by a piston in the cylinder of the engine includes the steps of: (1) radiating a radio frequency wave into a combustion chamber defined by the piston in the cylinder; (2) moving the piston in the cylinder through at least one stroke to excite at least one resonance of the wave in the cylinder; (3) detecting the reflected analog radio frequency signal occurring during the motion of the piston; (4) generating a timing signal corresponding to crankshaft rotation; (5) converting the analog radio frequency signal to a plurality of digital signals related to the amplitude of the radio frequency signal and the frequency of the timing signal; (6) calculating a parameter of the resonance from the digital signal; and (7) correlating the calculated parameter with a reference of the same parameter to determine the diagnostic condition.

Preferably, the detected analog microwave signal is converted into digital form in synchronism with the output of a digital angle encoder coupled to the crankshaft of the engine. Also, preferably, the converted digital data is operated upon by software to identify for each microwave resonance the location of the resonance, the Q of the resonance, the peak-to-peak amplitude of the resonance, the slope of the resonance and the symmetry of the above-mentioned four parameters with respect to turnaround points of the piston.

Further in carrying out the above objects and other objects of this invention a preferred embodiment of apparatus for producing diagnostic information related to a diagnostic condition in a multiple stroke internal combustion engine having a crankshaft which rotates in response to motion by a piston in a cylinder of the engine, comprises radiating means for radiating a radio frequency wave into a combustion chamber defined by the piston in the cylinder so as to excite at least one resonance of the wave in the chamber when the piston moves through one stroke. The apparatus further comprises detecting means for detecting the reflected analog radio frequency signal occurring during motion of the piston and generating means adapted to be coupled to the crankshaft for generating a timing signal relating to the amount of crankshaft rotation. A converting means converts the analog radio frequency signal to a set of digital signals related to the amplitude of the radio frequency signal and the frequency of the timing signal. First storing means stores the set of digital signals and second storing means stores a second set of corresponding digital signals representing at least one parameter. A programmable calculating means is coupled to the converting means, the first and second storing means and the generating means for first calculating the same parameter associated with the resonance from the first set of digital signals and then correlating the values of the parameters to identify the diagnostic condition. The converting means is controlled by the calculating means to convert in response to the timing signal.

The objects, features and advantages of the present invention are readily apparent from the following detailed description of the best mode when taken in connection with the accompanying drawings.

BEST MODE FOR CARRYING OUT THE INVENTION

Figure 1:
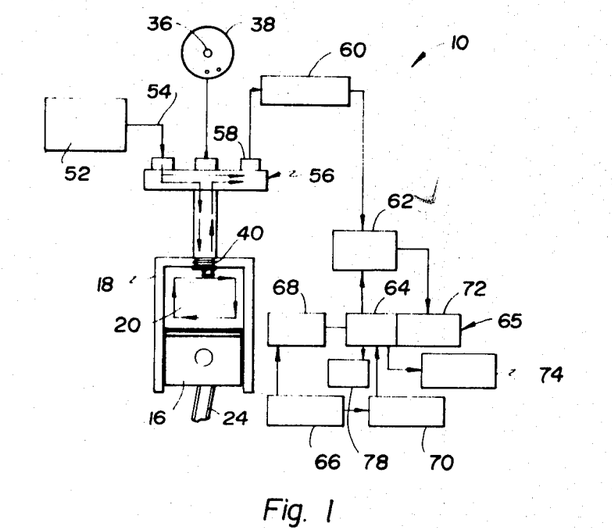
FIG. 1 is a schematic view, partially broken away, illustrating the method and apparatus of the present invention utilized in connection with a single cylinder of an internal combustion engine.
Figure 2:
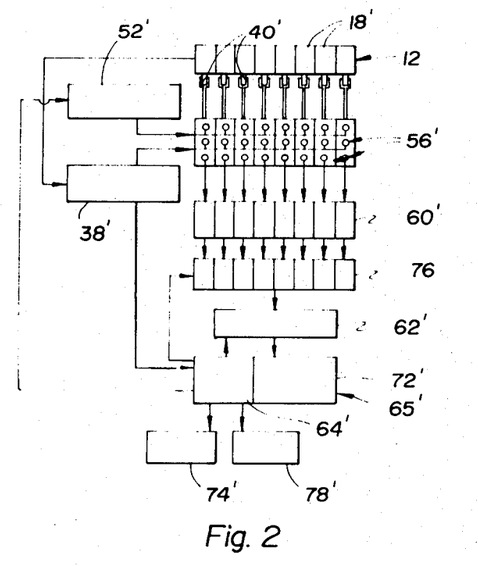
FIG. 2 is a schematic view illustrating the method and apparatus of the present invention utilized in connection with multiple cylinders of an internal combustion engine.

Referring to FIG. 1 there is illustrated generally at 10 an apparatus which produces diagnostic information from microwave energy radiated into at least one combustion chamber in a multiple stroke internal combustion engine schematically illustrated at 12 in FIG. 2. The apparatus 10 can be utilized to provide information relating to diagnostic conditions such as identification of top dead center for the purposes of ignition timing; measurement of valve timing, measurement of valve lift; detection of a burnt exhaust valve; measurement of wear in a rod bearing; detection of a bent rod; detection of a hole in the piston; detection of a broken compression ring; detection of a missing bearing clip; measurement of motion of a compression ring; detection of a hole in the piston; measurement of compression ring wear and compression ring malfunction such as flutter; measurement of piston timing; identification of the ignition signal for purposes of ignition timing; detecting of preignition; detection of engine misfiring; and detection of cyclic dispersion.

Figure 3:
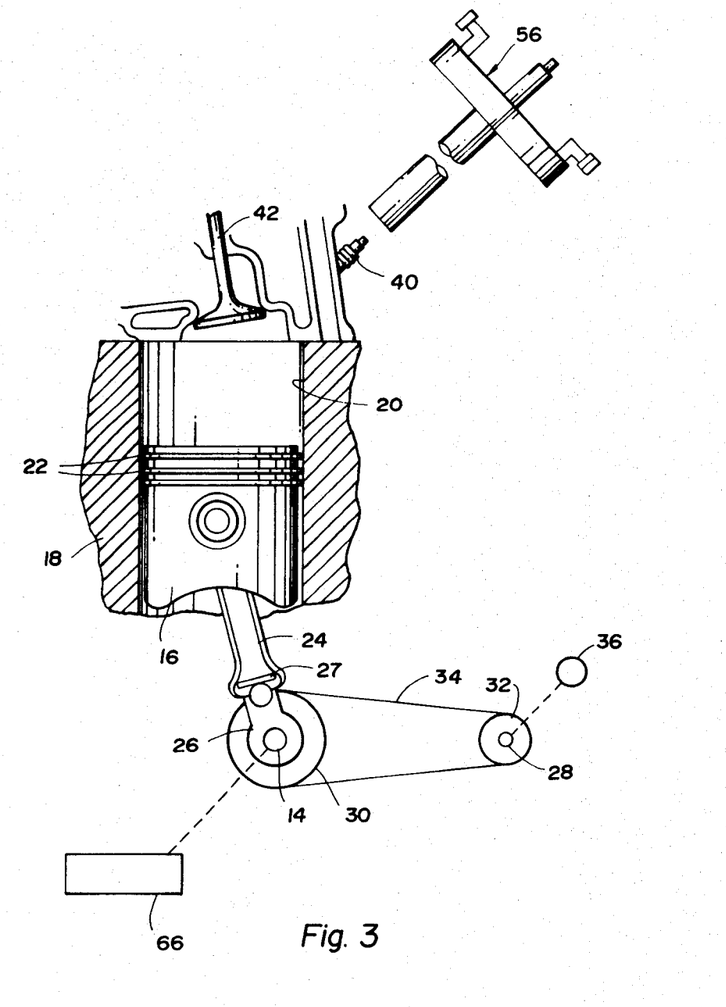
FIG. 3 is a view, partially broken away and in cross-section, illustrating the use of the present invention in an internal combustion engine having a rotating crankshaft.
Figure 4:
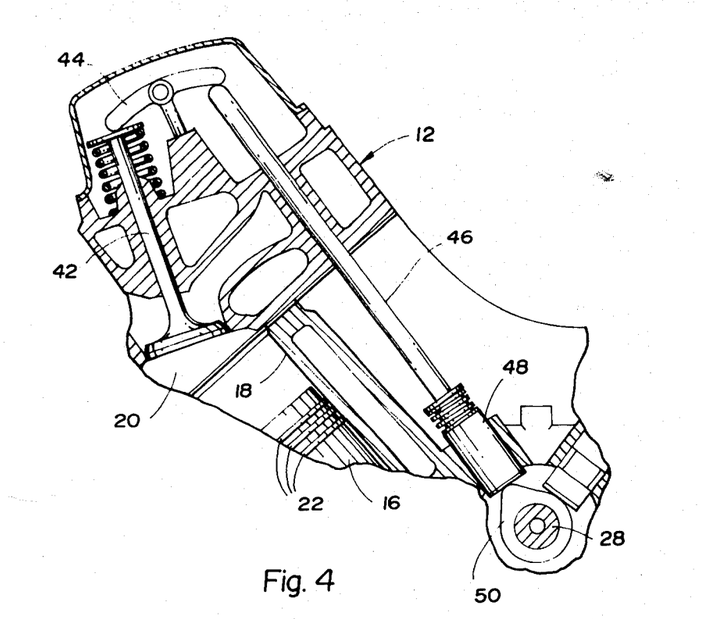
FIG. 4 is a view, partially broken away and in cross-section, illustrating the various mechanical components typically coupled to the engine crankshaft.

The engine 12 comprises a multiple stroke internal combustion engine, either diesel or spark ignition type, which has a crankshaft 14 shown in FIG. 3 which rotates in response to motion by a plurality of pistons, one of which is indicated at 16 in FIGS. 1, 3 and 4. The piston 16 moves in a cylinder 18 which together define a combustion chamber 20. The piston 16 is slidably mounted within the cylinder 18 by rings 22 as shown in FIGS. 3 and 4. The piston 16 is connected to the crankshaft 14 through a connecting rod 24, a crank journal 26 and interconnecting bearing clips illustrated schematically at 27. In turn, the crankshaft 14 is coupled to a camshaft 28 by a crankshaft gear 30 mounted for movement on the crankshaft 14, a camshaft gear 32 also mounted for movement on the camshaft 28 and an interconnecting timing chain 34 which drives the gear 32 upon rotation of the crankshaft gear 30.

The camshaft 28 is coupled to a distributor shaft 36 which, in turn, is rotatably mounted in a distributor 38 as shown in FIG. 1 to provide the timing for the sparking of a spark plug 40 which extends into the combustion chamber 20.

As shown in FIG. 4, the camshaft 28 is also coupled in a conventional fashion to the valves of the engines, such as the exhaust valve 42 through a rocker arm 44, a push rod 46, a tappet or valve lifter 48 and cam lobe 50 mounted for rotation on the camshaft 28.

The equation that defines the interrelationship between the diameter of the cylinder 18, its height and the natural frequency of microwave resonance is given by Equation 1:

$$L = \frac{B}{\sqrt{\frac{4EF^2}{S^2} - \frac{4C^2}{\pi^2 D^2}}} \quad (1)$$

$L$ is the length at any given instant of the cylinder 18;
$E$ equals the relative dielectric constant of the cylinder 18 at a particular moment in time;
$F$ is the frequency of the microwave energy introduced into the combustion chamber 20;
$C$ is a dimensionless constant relative to the type of resonance mode to be excited, values of which are given hereinbelow;
$D$ is the diameter of the cylinder 18;
$B$ is the order of the particular resonance mode; and
$S$ is the speed of light.

The values of C are given in the following Table 1:

| Mode | Value for "C" |
|---|---|
| $TE_{11}$ | 1.84 |
| $TE_{01}$ | 2.40 |
| $TE_{21}$ | 3.05 |
| $TM_{11}$ | 3.83 |
| $TE_{01}$ | 3.83 |
| $TE_{31}$ | 4.20 |
| $TM_{21}$ | 5.13 |
| $TE_{41}$ | 5.31 |
| $TE_{12}$ | 5.33 |
| $TE_{02}$ | 5.52 |

The equation for the motion of the piston 16 within the cylinder 18 is given by Equation 2:

$$L = R + A/2 + H - \sqrt{R^2 - (A/2 \sin \theta)^2} - A/2 \cos \theta \quad (2)$$

$R$ is the length of the connecting rod 24;
$A/2$ is one-half of the stroke length;
$\theta$ is the crank angle of the crankshaft 14; and
$H$ is the head space at top dead center.

$H$, the head space at TDC, results from the space of the head over the cylinder 18. It is assumed to be an average value that extends the length of the cylinder 18. This is approximately true for calculating resonances that have values greater than 90° (for crank angles of resonances less than 90° a different philosophy must be employed).

If one substitutes the values for L from Equations 1 and 2 and solves for $\theta$, the following Equation 3 for crank angle is obtained:

$$\theta = \cos^{-1}\left[\frac{2RX - X^2}{A(X - R - A/2)} + 1\right] \quad (3)$$

where $X = Z - H = B$ $-H$ $$X = Z - H = \frac{B}{\sqrt{.0287 EF^2 - \frac{.405 C^2}{D^2}}} - H$$

Alternatively, the value for $\theta$ is given by the following Equation 4:

$$\theta = \cos^{-1}(1 - 2/A(B/(0.0287\ EF^2 - 0.405\ C^2/D^2)^{\frac{1}{2}} - H)) \quad (4)$$

Figure 7:
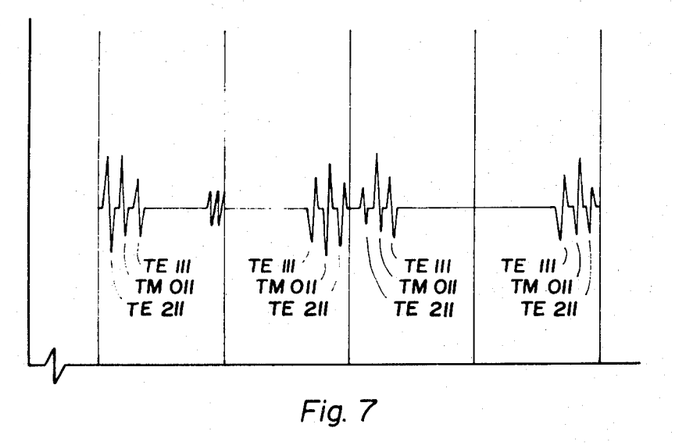
FIG. 7 is a chart illustrating the various resonances developed during each of the strokes of the internal combustion engine.

The solution for Equation 4 may be utilized to predict crank angles where resonances occur during the compression, combustion or power, exhaust and intake strokes as shown in FIG. 7. Equation 4 provides solutions between crank angle 90° and crank angle 179.9°. If substitution of a C and a B value results in a crank angle greater than 180° the particular mode selected cannot be excited into resonance in the cylinder whose dimensions form the remainder of the equation.

If one considers the 10 modes given for the C values as shown in Table 1 in combination with several periods (i.e. different B values) there exists a possibility of exciting over 70 different resonances during one stroke in the cylinder. However, the number of resonances excited and their behavior during the piston stroke depend upon the selection of the operating frequency of the system, F. By controlling the frequency it is possible to select a number of resonances which are convenient for data processing and will provide sufficient information for diagnostic purposes.

The particular considerations involving the selection of a particular frequency are: (1) the fewest number of resonances needed to provide the information necessary; (2) the relative sensitivity at a particular frequency or particular resonance mode to change in crank angle degrees (see FIG. 5).

As shown in FIG. 7, as the piston 16 moves through the four strokes the microwave properties of the cylinder 18 are altered during the period of time occupied by each stroke during motoring of the engine in cold test. An "ideal" cylinder condition exists during the compression period since both the intake and exhaust valves are closed and the mixture and the dielectric constant of the compressed mixture has a relatively minor effect upon the resonances.

During the intake stroke the "ideal" cylinder is modified by the opening of an intake valve. During the power stroke the mechanical dimensions of the cylinder are the same as during the compression stroke. For hot test during the combustion process, however, the dielectric properties within the enclosure change. During the exhaust stroke the exhaust valve 42 opens to also change mechanical properties of the cylinder 18.

With reference to FIG. 1, the apparatus 10 includes a radio frequency or microwave source or oscillator 52. The microwave energy is transmitted along a coaxial transmission line 54 to a spark plug coupler generally indicated at 56. Alternatively the microwave energy may be introduced into the combustion chamber 20 by a loop probe which acts not only as a transmitting antenna but also as a receiving antenna. Coupling to such a loop probe is adjusted by means of a coaxial transmission line stretcher.

The spark plug coupler 56 is adapted to receive the spark plug 40 so that the plug 40 extends into the combustion chamber 20 when the coupler is attached to the engine 12. The spark plug 40 radiates the received microwave energy into the combustion chamber 20 and thereafter receives the reflected microwave energy. The reflected microwave energy is detected by a crystal detector 58 of the spark plug coupler 56. The crystal detector 58 produces a time-varying analog signal which contains the resonances developed within the cylinder 18. The output of the detector is provided to an amplifier 60.

The spark plug coupler 56 may comprise a spark plug coupler disclosed in the previously mentioned Merlo patents.

Coupling to the cylinder 12 can result in either resistively coupled wave forms of resonances or reactive forms of resonances. One property of the resonance signal of the reactive form of resonance is that the resonance signal appears in the form of a discriminator characteristic, that is, an S-shaped curve.

Examination of a detected analog signal at the amplifier 60 reveals the following:

(1) the same types of resonances that occur going from 0° crank angle to 180° crank angle invariably appear in all four strokes of the cycle. Any variation in number depends upon mechanical as well as gas changes in the cylinder during a stroke;

(2) conditions resulting in the change of cylinder dimensions and also dielectric constant will change the crank angular positions of the resonances and in some cases prevent the excitation of some of the resonances near the bottom of a stroke;

(3) "S" shapes correlate such that "downgoing" strokes (power, intake) can be differentiated from "upgoing" strokes (compression, exhaust). The S-shaped resonances take 180° phase reversals;

(4) a symmetry condition exists in resonances around the top of the compression-power strokes on a motored engine. Both mechanical and dielectric conditions around this top are symmetrical;

(5) the sharpness of the resonance depends upon the quality of the dielectric within the enclosure at the time of resonance. If the dielectric is lossy, the resonance will have a low Q value. The outcome is a reduction in sharpness. Sharpness also depends on the mechanical integrity of the cylinder; bad fits of components reduce Q value; (i.e. a broadening);

(6) the top and bottom of the stroke can be detected in the signal by the point of phase reversals in the S-shapes of the resonances.

Referring again to FIG. 1, an analog signal produced at the detector 58 and amplified by the amplifier 60 is converted to a digital signal by means of an analog to digital converter 62 under the control of a central processing unit or CPU 64 of the computer 65. The generated analog signal varies in amplitude with the passage of time as a result of the reciprocating motion of the piston 16 within the cylinder 18 of the engine 12. In effect, the piston 16 tunes the cylinder 18. In other words, the cylinder 18 functions as a turnable, microwave, cylindrical resonator through many resonant positions.

The A/D converter 62 performs the analog to digital conversion on the analog signal in synchronism with the output of a digital angle encoder 66 which is fastened or coupled to the crankshaft 14 as indicated in FIG. 3. The output of the encoder 66 is fed to a pulse shaper 68 which shapes the output pulses from the encoder 66 and passes the pulses on to the CPU 64 in a form that the CPU 64 can readily accept. The output of the encoder 66 is also fed into a counter 70 which provides a signal to the CPU 64 in the form of a pulse which indicates to the CPU 64 that the number of pulses from the encoder 66 is equivalent to one complete cycle of the engine 12. The A/D conversions are made by the A/D converter 62 under the control of the CPU 64 every one-tenth of a degree of crankshaft rotation. Each conversion consists of an eight bit byte and is stored at an address in a RAM 72 of the computer 65. Approximately four engine cycles may be stored in 24k of RAM. As will be explained in greater detail hereinafter, this block of data can be transferred to a PROM by means of a PROM burner, onto a magnetic tape or a floppy disc thereby representing the permanent history of the engine cycles run. Alternatively, the data can be operated upon immediately by software to determine "on line" the diagnostic condition which may be displayed on the display such as display 74 which may comprise, in combination, an alphanumeric display and a printer.

Referring now to FIG. 2, there is shown an apparatus similar to the apparatus in FIG. 1 except the apparatus in FIG. 2 provides diagnostic information relating to a diagnostic condition relating to any one of a plurality of cylinders 18' in the engine 12, which in the embodiment shown in FIG. 2 comprises eight cylinders. For purposes of convenience like components of FIG. 2 to those components of FIG. 1 will have a prime designation. Also, as with the apparatus of FIG. 1 the apparatus of FIG. 2 can be utilized for both hot and cold testing.

A radio frequency or RF source 52' comprises a low-power microwave source having an output range of 10 to 15 milliwatts. The output of the source is fed to a microwave PIN diode, integral driver switch of the RF source 52' having eight positions. The switch time shares the power source among the eight cylinders 18' under the control of the CPU 64'.

A spark distributor 38' coupled to the crankshaft of the engine 12 distributes the high voltage necessary to cause sparking across spark plugs 40' contained within couplers 56'. The reflected microwave energy is detected by detectors on the couplers 56' and amplified by a bank of amplifiers 60'. A multiplexer 76 and an A/D converter 62' are both under the control of the CPU 64' to fast-fill a mass storage device such as random access memory or RAM 72' to provide high resolution, sampled data from all of the cylinders 18'. High resolution in collecting the sample may be accomplished by operating an engine 12 in low speed and multiplexing the multiplexer 76 at the highest rate available within the limits of the components. The settling time of the A/D converter 62' permits mass storing of one spark plug channel sliced into eight bit bytes each 10 microseconds. Faster A/D converters are also available which operate at 30 MHZ and even as high as 100 MHZ sampling speed.

Figure 9A:
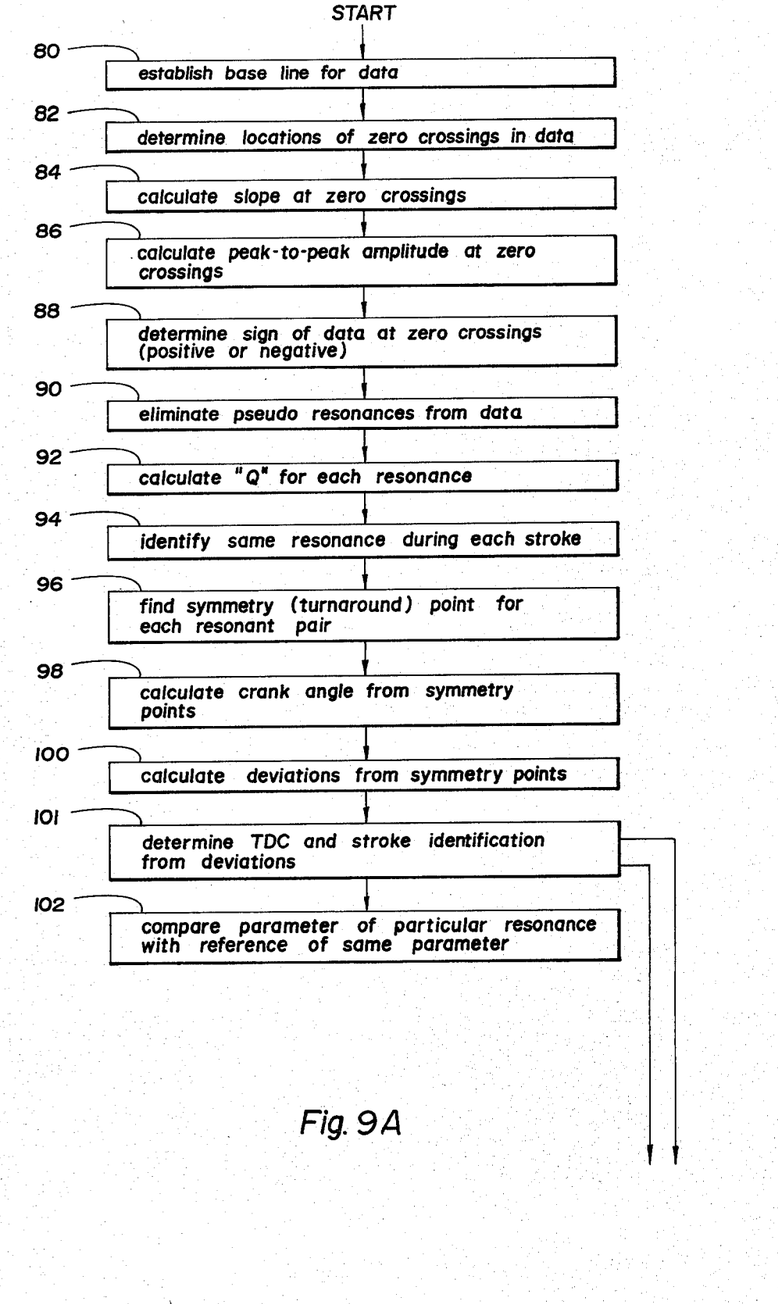
FIG. 9A is a first part of a block diagram illustrating the various steps taken in processing the digitized signal to determine various diagnostic conditions.
Figure 9B:
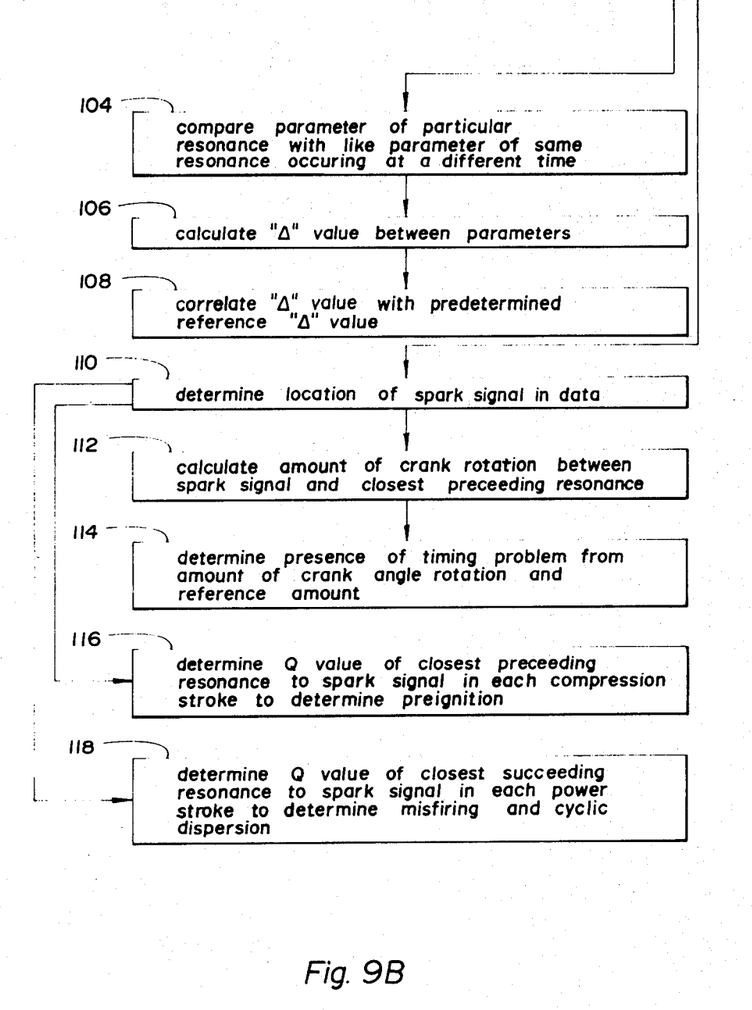
FIG. 9B is a second part of the block diagram of FIG. 9A.

Referring to FIG. 9, there is illustrated the steps of a computer program which may be stored in a read-only memory or PROM 78 of FIG. 1 or the PROM 78' of FIG. 2 to analyze the digitized analog signal stored in the RAM 72 or the RAM 72', respectively. However, it is to be understood that the microwave signal may be sampled by a sample and hold circuit under control of the CPU 64 to obtain the digitized signal.

Figure 8:
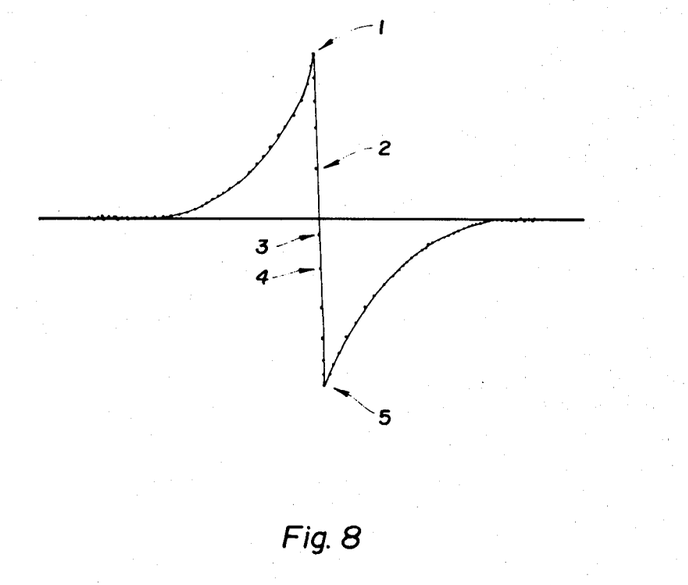
FIG. 8 is a graph illustrating the change in amplitude of a single resonance with changing crank angle wherein the dots represent actual data points.

Referring to FIG. 8, there is illustrated an enlarged digitized signal of a single resonance wherein each dot represents actual data points presented to the A/D converter 62. The dots have been connected together to illustrate the shape of the resonance signal.

As illustrated at block 80 of the program a base line is established for the data which corresponds to the average value of the digitized signal. It is to be understood that for each byte of data within the block of data an address is provided within the RAM 72.

As illustrated at block 82, data at an address above the base line is identified as being positive and data at an address below the base line is identified as being negative. For example, data point 2 is positive and data point 3 is negative. The location of the resonance is identified as being between the address of point 2 and address of point 3.

As illustrated by block 84 the slope of the resonance is calculated as being the vertical distance between data points 2 and 4. This is done by subtracting the value of data point 4 from the value of data point 2.

Block 86 illustrates the calculation of the peak-to-peak amplitude of the resonance and is calcuated by subtracting the data at the address of data point 1 from the data at the address of data point 5 (the maximum and minimum values of the resonance).

Referring now to block 88, the sign of the resonance illustrated in FIG. 8 must be determined as being positive or negative. The convention employed is that data representing the resonance starting in the positive voltage region and ending in the negative voltage region is said to be negative. As shown in FIG. 7, the sign of each of the resonances occurring during the compression and exhaust strokes are negative and, conversely, the signs of each of the resonances in the combustion and intake strokes are positive. In other words, all of the resonances on the uptake of the piston 16 will have the same sign and all the resonances on the down stroke of the piston will have an opposite sign. Consequently, the top dead center and the bottom dead center of a piston 16 occurs in the data in a region between resonances with different signs as shown in FIG. 7.

Referring now to block 90, data which looks like resonances, but are not truly resonances, are eliminated from the true resonances by analyzing various parameters of the previously identified resonances including location, sign and slope of each of the resonances. For example, if the data previously identified as a resonance exhibits a relatively small slope, a relatively small peak-to-peak amplitude or has the opposite sign in a group of resonances having the same sign, the data will no longer be identified as a resonance.

As illustrated by block 92 the "Q" or quality factor of each of the resonances is calculated from the steepness of the slope of the resonance to obtain an approximation of the Q value after which the slope is adjusted to account for the instantaneous linear velocity of the piston at the crank angle that the resonance occurred. The instantaneous linear viscosity at the crank angle at which a resonance occurs is derived from top and bottom dead center measurements and is used to correct the Q values. This table is accessed by the CPU 64 from the RAM 72 or from a PROM burned for the particular engine.

Referring now to block 94 the same resonances which occur during each stroke are identified. For example, the $TE_{211}$ mode, as shown in FIG. 7, is identified in each of the compression, combustion, exhaust and intake strokes by recognizing the symmetry of the resonance about the bottom dead centers and top dead centers and also by the fact that movement between consecutive strokes changes the polarity of all of the resonances contained within that particular stroke.

At block 96 the symmetry or turnaround point for each resonant pair is calculated (i.e. the same resonance on each side of a turnaround point). The addresses of the negative or positive resonances on one side of a turnaround point are added to the same positive or negative resonances respectively on the other side of the turnaround point and the resulting addresses are each divided by two. This calculation is performed with all pairs of resonances existing on both sides of a turnaround point. For example, if there are four resonances on each side of a turnaround point, four sets of calculations are performed to determine the address of the turnaround point. The results of these calculations comprise a spread of addresses which identify the turnaround address or point. If there are four resonances on each side of a turnaround point, the average value of the spread of addresses is determined to be the turnaround or symmetry point. The crank angle of the crankshaft 14 is then determined from the address in RAM corresponding to the calculated symmetry points as indicated by block 98.

Block 100 illustrates the calculation of a deviation from a symmetry point or, in other words, the value representing the spread in the values resulting from the calculations of the addresses from all the resonances about a symmetry point. The spread or deviation value at the compression-power turnaround point is the smallest one compared to all the other spreads in a motored engine due to the fact that that particular turnaround point is calculated from resonances which occur during substantially identical conditions in the combustion chamber. All other turnaround points exhibit greater deviation due to the shifting of resonances from the influence of valve motion which shift the resonances from symmetry.

Block 101 illustrates the selection of the particular address having the smallest spread and identifies this turnaround point as the compression-power turnaround point (TDC). The remaining turnaround points are easily identified by prior information containing the sequence of strokes in the engine 12 which information may be stored in the PROM 78.

The symmetry of resonances between the compression stroke and the power stroke is utilized to calculate top dead center of the engine 12 for ignition timing purposes. Such symmetry can be utilized to identify top dead center within ±0.1 degree of top dead center.

A number of diagnostic conditions can be identified from the above calculated parameters of the resonances occurring during the different strokes of the engine 12.

Figure 5:
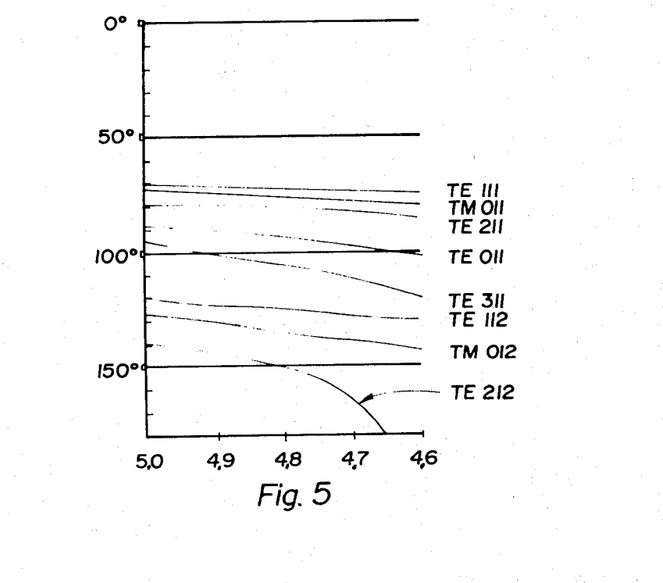
FIG. 5 is a chart illustrating the change in resonant crank angle with changing microwave frequency for various resonances for a particular engine.

As shown in FIG. 5, the resonance marked $TE_{212}$ is of particular interest because it is more sensitive than the other resonances to changes in physical and electrical parameters for the particular engine and the particular frequency shown. As shown in FIG. 5, the $TE_{212}$ resonance appears between 140° and 180° from the beginning of the combustion stroke as shown in FIG. 7. Assuming that the exhaust valve 42 begins to open before the end of the power stroke at approximately 137°, is completely open at 248° into the exhaust stroke and closes at 360° or the beginning of the intake stroke, it is possible to utilize the $TE_{212}$ resonance to determine the effect of the exhaust valve motion on the reflected analog signal. It has been found that the $TE_{212}$ resonance shifts approximately 8° towards higher crank angles corresponding to movement of the exhaust valve of approximately 0.29 inches.

Figure 6:
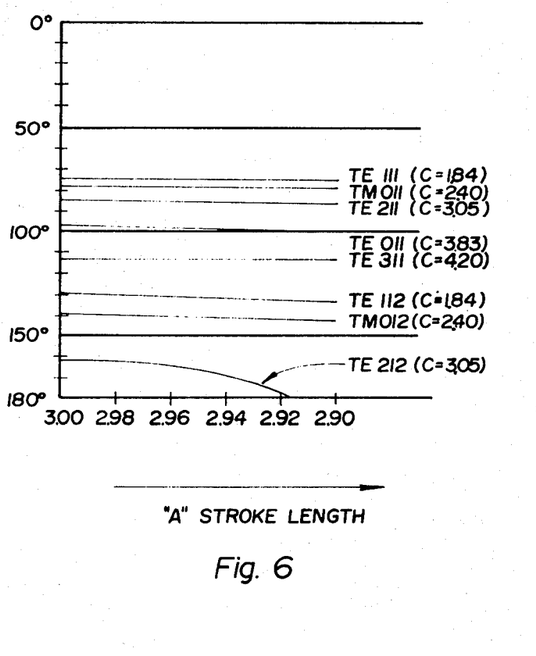
FIG. 6 is a chart illustrating changes in resonant crank angle with changing stroke length at a constant-exciting frequency.

Referring to FIG. 6, there is illustrated the calculated effect of the $TE_{212}$ resonance when the operating frequency is 4.7 gigahertz and the stroke length is changed by 0.12 inches in the steps of 0.02 inches from a starting point of 3 inches to an end point of 2.9 inches. The $TE_{212}$ resonance moves from a starting point of 161° at the bottom of the stroke to 180° for a 0.08 inch shortening of the stroke length.

Equation 4 can also be used to predict resonant crank angles with a high degree of accuracy as long as the frequency of the microwave signal source is relatively stable. The other parameters contained within Equation 4 Iwhich are subject to change besides the frequency are the length of the piston stroke, A; the diameter of the cylinder bore, D; and, the height of the dome over the cylinder in the head, H. Changes in the dimensions of A, D and H result in changes in the resonant crank angle of a resonant mode with changes in crank angle similar to those produced by changes in the microwave frequency, F, as previously discussed with reference to FIG. 5.

Changes occur in parameter H as a result of the change in position of the end wall of the cylinder resonator. For resonance crank angles greater than 90°, the beginning value of H is reduced in magnitude as the valve 42 opens. H represents an average lengthening of the end wall of the cylinder for crank angles of resonances greater than 90°. However, for crank angles of resonances less than 90° the concept for producing resonances is no longer that of a cylindrical resonator due to the various shapes of heads. In general, the new resonator for these low values of crank angle approximates more that of a rectangular resonator in which the piston changes the magnitude of its height and consequently the impedance of the resonator. For a head having the plug on the edge of the cylinder, standing waves of resonances are set up perpendicular to the axis of the cylinder from one edge of the cylinder to the other edge of the cylinder, the head forming the top surface and the top of the piston forming the bottom surface of this resonator. If the head has mounds in it there is a fast transition between modes of resonances from the cylinder edge to the mound as the piston moves up to top dead center towards the mound.

Some resonances also experience a change in Q value. Changes occurring in the D dimension are less complex and result in direct changes in the crank angle. Changes that occur in the value of A may result for example from a missing bearing clip which permits a reduction in distance from the head of the piston 16 to the crank journal 14 by an amount of approximately 0.100 inches.

If the bottom bearing clip is missing, the piston 16 does not achieve the same bottom position as when the bottom clip is in place. For example, the piston 16 will be higher in its stroke at its bottom by 0.100 inches. This results in a reduction in the value of A in Equation 4 by 0.100 inches. FIG. 6 shows the results of calculations for a change in the value of A in increments of 0.02 inches. Consequently, by focusing on a shift of the resonance $TE_{212}$ one can detect the absence of a bottom bearing clip.

When the top bearing clip is missing, the piston 16 finds the same bottom as the piston 16 with its clips intact. However, it does not achieve the same height at the top of its stroke by 0.100 inches. Because the crank journal 26 does not separate from the bottom clip to touch the connecting rod 24 until about 90° up from the bottom, a resonance mode must be selected which exhibits some sensitivity at crank angles less than 90°. The $TE_{111}$ mode may be utilized to detect the absence of the top bearing clip even though the resonance only shifts between one and two degrees with a corresponding drop in stroke length. The rectangular-like mode resonance, identified as $TE_{10N}$, at crank angles less than 90° can be employed to provide more sensitivity.

At approximately 150° from top dead center between the compression and combustion strokes the connecting rod bearing experiences a large force exerted by the crankshaft journal 30. The $TE_{212}$ resonance at this crank angle has a higher sensitivity to changes in resonator dimensions. In other words, large crank angular shifts occur for small changes in resonator dimensions. Therefore, it is possible to detect the presence of out-of-tolerance bearings by observing the shift in the $TE_{212}$ mode.

A shift in the location of the $TM_{011}$ mode (or other modes with electric fields traversing the rings) relates to a movement of a compression ring 22 in that the $TM_{011}$ mode has an electric field completing its electric current path through the ring 22. Rings 22 that are worn, result in a difference in the value of Q between the compression and power strokes. Therefore, a comparison of the Q's of the $TM_{011}$ mode resonances in the compression and power strokes of a motoring engine indicates ring wear which is a diagnostic condition that can thereafter be indicated such as on the display 74.

Another diagnostic condition which can be detected by a comparison of Q values is whether there is a hole in the piston 16, typically caused by detonation. For example, if there is a hole in the piston 16 approximately one-half inch in diameter the value of Q changes approximately 10% from its expected value during the compression stroke and approximately 8% during the power stroke. This is the result of losses resulting from coupling out energy through this hole.

Not only are piston holes created as a result of detonation or spontaneous ignition, but also compression rings break as a result of such detonation. Both the $TE_{111}$ mode and the $TE_{211}$ mode complete their electrical conduction paths in the rings 22. The break in the compression ring 22 causes a measurable change in the Q and also the amplitude of the observed resonance not only during the compression stroke, but also the power stroke. This change may be measured and compared against a reference quality factor or a reference peak-to-peak amplitude of the same resonance measured when the compression ring 22 is not broken.

If the connecting rod 24 is bent for any reason, all of the resonances, including the $TE_{111}$, the $TM_{011}$ and the $TE_{211}$ resonances are shifted by an amount which can be predicted through the use of Equation 4. If the connecting rod 24 is bent it becomes shorter and therefore the length of the cylinder 18 forming the microwave resonator differs from that in which the connecting rod 24 is not bent at the same angle of crankshaft rotation. The resonances near the bottom of the piston stroke, such as the $TE_{211}$ mode are more sensitive to changes in dimensions than those in the middle of a stroke and consequently a greater amount of shift is experienced by the $TE_{211}$ mode due to the bent connecting rod 24. A shorter connecting rod 24 of even a tenth of an inch will result in a shift at which the $TE_{211}$ mode appears by approximately 9° in crank angle towards greater crank angles.

Diagnostic conditions such as the motion of the exhaust valve 42 and the motion of the piston 16 can also be obtained. For example, when the exhaust valve 42 pushes into the combustion chamber 20 of the cylinder 18, it produces a reaction from the cylinder 18. The valve 42 acts like a tuning plunger and causes the cylindrical resonator to change frequency at which it can be excited into resonance. In other words, in order to excite the cylindrical resonator into resonance after the valve has been pushed in, the length of the cylinder must be increased, assuming a constant frequency.

The lengthening of the cylinder 18 to excite a resonance corresponds to a shift in the crank angle of the resonance further away from top dead center. There exists an almost linear relationship between the distance that the valve is pushed into the cylinder and the amount that the resonance shifts towards the bottom of the stroke. Because the exhaust valve 42 and the intake valve (not shown) do not move during the compression and power strokes, reference crank angles for resonances excited within the combustion chamber 20 can be recorded either during the compression or power strokes and can be subsequently used to detect shifts in the same resonances during movement of the exhaust valve 42 during the exhaust stroke. This same concept can be used to detect shifts resulting from the movement of the intake valve.

A reduction in the value of the microwave frequency produces a repositioning of the microwave resonances observed during compression and power strokes towards the bottom of the stroke. The effect of repositioning resonances during the compression and/or power strokes can be viewed as sampling a new depth of the valve 42 into the cylinder 18. By changing the frequency before the measurement several times, it is possible to measure the motion of the valve 42 as it pushes into the cylinder 18.

The depth of the valve 42 as it is pushed into the cylinder 18 at a given crank angle is a result of the interaction of several mechanical components linked to and propelled by the crankshaft 14. These components include the valve 42, the rocker 44, the push rod 46, the valve lifter 48, the cam lobe 50, the cam shaft gear 32, the timing chain 34 and the crankshaft gear 30. Each of these components makes a contribution to the locus of points on a graph illustrating the magnitude of penetration of the valve 42 as a function of crank angle.

In like fashion, the diagnostic condition comprising a motion of the piston 16 may be obtained. Both the motion of the valve 42 and the motion of the piston 16 may be compared with previously recorded measurements of the motions which, again, may be stored in the PROM 78. The motion measurements of the valve 42 and the piston 16 may be compared also with predictions of the valve motion determined by a theoretical equation which employs the parts of the linkage which drives the piston 16, such as Equation 2. This may be done for the purpose of isolating the failure of a component part making up the linkage.

The data previously obtained regarding each of the resonances can also be used to detect the diagnostic condition of a burnt exhaust valve. Burnt valves are initially caused by a small leak. In the course of permitting gases to escape, the leaking channel acts as a conduit for hot combustion products. These products soften the metal in the channel by virtue of their elevated temperature and the metal is blown away with the gases. The enlarged hole defined by the burnt exhaust valve comprises coupling hole which passes microwave energy out of the cylindrical resonator and into the exhaust manifold. An increase in the size of the hole increases the magnitude of the coupling which appears as a loss to the resonator and results in a percentage slope difference in the resonances occurring during compression and power strokes of a motoring engine.

The above-mentioned diagnostic conditions which may be correlated with the changing parameters of resonances are illustrated by blocks 102, 104, 106 and 108 in FIG. 9.

As shown in FIG. 7, the spark signal from the spark plug 40 produces radiations that enter the transmission line of the microwave signals and are detected by the crystal detector 58. The radiations produced by the spark discharge are not coherent and cover a wide band of frequencies. The signal appearing at the microwave detector 58 during the spark discharge has approximately the same amplitude as the resonances, has the appearance of receiver noise and corresponds to the duration of the spark. The spark signal becomes part of the total microwave signal appearing at the crystal detector 58.

As shown in FIG. 7, the spark signal occurs during the compression stroke, the address or location of which is calculated with reference to the previously identified compression resonances as indicated at block 110 of FIG. 9. At block 112 the address of the closest compression resonance is subtracted from the address of the spark signal. At block 114 the difference address is compared with a reference value corresponding to the same measurement which occurred when the engine 12 was new and which also may be stored in the PROM 78. The difference between the two measurements may also be compared with a theoretical equation (not shown) but comparable to Equation 2, which incorporates the components of the system such as the distributor 38 and its shaft 36, employed to generate the spark signal. This comparison is performed in order to isolate a component of the spark ignition system that is marginal or ready to fail.

Referring to step 116, a pre-ignition diagnostic problem can be determined by obtaining the value of the Q of the last rectangular mode resonance prepositioned in angle, before the spark discharge. A relatively low value of Q indicates premature burning. Measuring various values of Q for the same resonance closest to the ignition signal provides useful information to quantitatively measure the amount of pre-ignition.

Referring to step 118, the value of Q of the first resonance after the spark discharge pulse during the combustion stroke is useful for measurement of misfiring of cyclic dispersion. This can be done with rectangular mode resonances at low crank angles. Cyclic dispersion is the variation in developed pressure from one power stroke to the next power stroke resulting from the variations in the burning of fuel.

The spark plug 40 may be utilized as an ionization gauge for measuring continuously the number of charged particles with the passage of time. The spark plug gap may be biased for the purpose of ionization current measurements with the voltage developed on the crystal by the microwave source 52.

The cylindrical resonator $TM_{010}$ resonance signal may be utilized to monitor instantaneously the cylinder height from the top of the piston 16 to the head. The signal that results from movement of the piston 16 is a periodic and sinusoidal signal related instantaneously to the motion of the piston 16. This sinusoidal signal is a result of the trigometric piston motion developed by the crankshaft 14 combined with the pushing of a standing wave having one-half wave length spaced nulls originating on the head of the piston 16 past the crystal 58 in the transmission line.

The above-described apparatus and method illustrate how data found in a computer processed microwave signal may be correlated with a particular fault or test condition in an engine. Shifts or changes of one or more parameters in the data are detected and recognized as diagnostic conditions.

While a preferred embodiment of the method and apparatus of the present invention has been shown and described herein in detail, those skilled in this art will recognize various alternative designs and embodiments for practicing the present invention as defined by the following claims.

What is claimed is:

1. A method for providing diagnostic information related to a diagnostic condition in a multiple stroke, internal combustion engine having a crankshaft which rotates in response to motion by a piston in a cylinder of the engine, said method comprising the steps of:

radiating a radio frequency wave into a combustion chamber defined by the piston and the cylinder;

moving the piston in the cylinder through at least one stroke to excite at least one resonance of the wave in the chamber;

detecting the reflected analog radio frequency signal occurring during the motion of the piston;

generating a timing signal corresponding to crankshaft rotation;

converting the analog radio frequency signal to a plurality of digital signals related to the amplitude of the radio frequency signal and the frequency of the timing signal;

calculating the location of the resonance from the digital signals with respect to the angle of the crankshaft;

calculating a parameter of the resonance from the digital signals; and correlating the calculated parameter with a reference of the same parameter to determine the diagnostic condition.

2. A method for providing diagnostic information related to a diagnostic condition in a multiple stroke, internal combustion engine having a crankshaft which rotates in response to motion by a piston including a mounted ring in a cylinder of the engine, the piston and the crankshaft being interconnected by a connecting rod, a rod bearing and bearing clips, said method comprising the steps of:

radiating a radio frequency wave into a combustion chamber defined by the piston and the cylinder;

moving the piston in a cylinder through at least one stroke to excite at least one resonance of the wave in the chamber;

detecting the reflected analog radio frequency signal occurring during the motion of the piston;

generating a timing signal corresponding to crankshaft rotation;

converting the analog radio frequency signal to a plurality of digital signals related to the amplitude of the radio frequency signal and the frequency of the timing signal;

calculating the location of the resonance from the digital signals with respect to the angle of the crankshaft;

correlating the calculated location with a reference location of the same resonance to determine the diagnostic condition.

3. The method as claimed in claim 2 wherein said reference location is predetermined and wherein said diagnostic condition comprises the presence of a bearing clip.

4. The method as claimed in claim 3 wherein the bearing clip comprises a top bearing clip and wherein said resonance comprises one of $TE_{111}$ resonance and the rectangular-like $TE_{10N}$ mode resonance.

5. The method as claimed in claim 3 wherein the bearing clip comprises a bottom bearing clip and wherein said resonance comprises the $TE_{212}$ resonance.

6. The method as claimed in claim 2 wherein said reference location is predetermined and wherein said diagnostic condition comprises the amount of rod bearing wear.

7. The method as claimed in claim 6 wherein said resonance comprises the $TE_{212}$ resonance.

8. The method as claimed in claim 2 wherein said diagnostic condition comprises the motion of the ring.

9. The method as claimed in claim 8 wherein said resonance comprises one of the $TM_{011}$, $TE_{111}$, $TE_{211}$, $TE_{212}$ and $TE_{101}$ resonances.

10. A method for providing diagnostic information related to a diagnostic condition in a multiple stroke, internal combustion engine having a crankshaft which rotates in response to motion by a piston including a mounted ring in a cylinder of the engine, said method comprising the steps of:

radiating a radio frequency wave into a combustion chamber defined by the piston and the cylinder;

moving the piston in the cylinder through at least one stroke to excite at least one resonance of the wave in the chamber;

detecting the reflected analog radio frequency signal occurring during the motion of the piston;

generating a timing signal corresponding to crankshaft rotation;

converting the analog radio frequency signal to a plurality of digital signals related to the amplitude of the radio frequency signal and the frequency of the timing signal;

calculating the location of the resonance from the digital signals with respect to the angle of the crankshaft;

calculating the quality factor of the resonance from the digital signals;

correlating the calculated quality factor with a reference quality factor of the same resonance to determine the diagnostic condition.

11. The method as claimed in claim 10 wherein said reference quality factor is predetermined and wherein said diagnostic condition comprises a hole in the piston.

12. The method as claimed in claim 11 wherein said resonance comprises one of the $TE_{211}$, $TM_{011}$ and $TE_{111}$ resonances.

13. The method as claimed in claim 10 wherein the piston is moved through at least two strokes to excite the same resonance during each of the strokes and the reference quality factor is calculated during said calculating step from one of said resonances and wherein said diagnostic condition comprises the amount of ring wear.

14. The method as claimed in claim 13 wherein said resonance comprises one of the $TM_{012}$, $TE_{211}$ and $TE_{111}$ resonances.

15. A method for providing diagnostic information related to a diagnostic condition in a multiple stroke, internal combustion engine having a crankshaft which rotates in response to motion by a piston including a mounted ring in a cylinder of the engine, said method comprising the steps of:
radiating a radio frequency wave into a combustion chamber defined by the piston and the cylinder;
moving the piston in the cylinder through at least one stroke to excite at least one resonance of the wave in the chamber;
detecting the reflected analog radio frequency signal occurring during the motion of the piston;
generating a timing signal corresponding to crankshaft rotation;
coverting the analog radio frequency signal to a plurality of digital signals related to the amplitude of the radio frequency signal and the frequency of the timing signal;
calculating the location of the resonance from the digital signals with respect to the angle of the crankshaft;
calculating at least one of the quality factor and the peak-to-peak amplitude of the resonance from the digital signals;
correlating the calculated parameter with a corresponding reference parameter of the same resonance to determine the diagnostic condition.

16. The method as claimed in claim 15 wherein said diagnostic condition comprises a broken ring.

17. The method as claimed in claim 16 wherein said resonance comprises one of the $TE_{211}$ resonance and the $TE_{111}$ resonance.

18. The method as claimed in claim 17 wherein said stroke comprises one of the compression stroke and the power stroke.

19. A method for providing diagnostic information related to a diagnostic condition in a multiple stroke, internal combustion engine having a crankshaft which rotates in response to motion by a piston in a cylinder of the engine, said method comprising the steps of:
radiating a radio frequency wave into a combustion chamber defined by the piston and the cylinder;
moving the piston in the cylinder through at least two consecutive strokes to excite at least one resonance of the wave having the same mode in the chamber during each stroke;
detecting the reflected analog radio frequency signal occurring during the motion of the piston;
generating a timing signal corresponding to crankshaft rotation;
converting the analog radio frequency signals to a plurality of digital signals related to the amplitudes of the radio frequency signals and the frequency of the timing signal;
calculating the locations of the resonances from the digital signals with respect to the angle of the crankshaft;
correlating the calculated locations to determine the angle of the crankshaft at the turnaround point between the two strokes.

20. The method as claimed in claim 19 wherein the strokes comprise the compression stroke and the power stroke and wherein the turnaround point comprises top dead center of the engine.

21. The method as claimed in claim 19 wherein the piston is moved in the cylinder through at least three strokes to excite at least one resonance of the wave having the same mode in the chamber during each stroke.

22. The method as claimed in claim 19, claim 20 or claim 21 wherein two separate resonances of the wave are excited during each stroke and wherein said correlating step includes the step of identifying the same resonance during each stroke.

23. The method as claimed in claim 21 wherein the correlating step includes the step of calculating the turnaround points between consecutive strokes from the same resonances occurring during consecutive strokes.

24. The method as claimed in claim 23 wherein the correlating step includes the step of determining which one of said calculated turnaround points comprises top dead center of the engine.

25. A method for providing diagnostic information related to a diagnostic condition in a multiple stroke, internal combustion engine having a crankshaft which rotates in response to motion by a piston in a cylinder of the engine, the piston and the crankshaft being interconnected by a connecting rod, said method comprising the steps of:
radiating a radio frequency wave into a combustion chamber defined by the piston and the cylinder;
moving the piston in the cylinder through at least one stroke to excite at least two resonances of the wave in the chamber;
detecting the reflected analog radio frequency signals occurring during the motion of the piston;
generating a timing signal corresponding to crankshaft rotation;
converting the analog radio frequency signals to a plurality of digital signals related to the amplitudes of the radio frequency signals and the frequency of the timing signal;
calculating the locations of the resonances from the digital signals with respect to the angle of the crankshaft;
correlating the calculated locations with corresponding reference locations of the same resonances to determine the diagnostic condition.

26. The method as claimed in claim 25 wherein said diagnostic condition comprises a connecting rod having an improper length.

27. The method as claimed in claim 26 wherein said two resonances comprise two of the $TE_{111}$ resonance, the $TM_{011}$ resonance and the $TE_{211}$ resonance.

28. A method for providing diagnostic information related to a diagnostic condition in a multiple stroke, internal combustion engine having a crankshaft which rotates in response to motion by a piston in a cylinder of the engine, and at least one valve coupled to said crankshaft to alternately open and close an opening into a combustion chamber defined by the piston and the cylinder, said method comprising the steps of:

radiating at least two radio frequency waves having different frequencies into the combustion chamber;

moving the piston in the cylinder through at least one stroke to excite the same resonance of each of the waves in the chamber;

detecting the reflected analog radio frequency signals occurring during the motion of the piston;

generating a timing signal corresponding to crankshaft rotation;

converting the detected analog radio frequency signals to a plurality of digital signals related to the amplitudes of the radio frequency signals and the frequency of the timing signal;

calculating the locations of the resonances from the digital signals with respect to the angle of the crankshaft;

correlating the calculated locations to determine the diagnostic condition.

29. The method as claimed in claim 28 wherein said diagnostic condition comprises the motion of the piston.

30. The method as claimed in claim 28 wherein said diagnostic condition comprises the motion of the valve.

31. The method as claimed in claim 28 wherein said step of correlating includes correlating corresponding reference locations of the same resonances with the calculated locations.

32. The method as claimed in claim 28, 29, 30 or 31 wherein said step of radiating includes radiating at least three radio frequency waves having different frequencies into the combustion chamber and wherein at least one resonance of each of the waves is excited and detected.

33. A method for providing diagnostic information related to a diagnostic condition in a multiple stroke, internal combustion engine having a crankshaft which rotates in response to motion by a piston in a cylinder of the engine, and at least one valve coupled to said crankshaft to alternately open and close an opening into a combustion chamber defined by the piston and the cylinder, said method comprising the steps of:

radiating a radio frequency wave into the combustion chamber;

moving the piston in the cylinder through at least two consecutive strokes to excite at least one resonance of the wave having the same mode in the chamber during each stroke;

detecting the reflected analog radio frequency signals occurring during the motion of the piston;

generating a timing signal corresponding to crankshaft rotation;

converting the analog radio frequency signals to a plurality of digital signals related to the amplitudes of the radio frequency signals and the frequency of the timing signal;

calculating the locations of the resonances from the digital signals with respect to the angle of the crankshaft;

calculating the slopes of the resonances from the digital signals;

correlating at least one of the calculated slopes with a reference slope to determine the diagnostic condition.

34. The method as claimed in claim 33 wherein said diagnostic condition comprises a burnt valve and wherein said strokes comprise the compression stroke and the power stroke.

35. The method as claimed in claim 34 wherein said resonance comprises one of the rectangular $TE_{10N}$ and cylindrical $TE_{111}$ modes of resonance and wherein said reference slope comprises the other one of said calculated slopes.

36. A method for providing diagnostic information related to a diagnostic condition in a multiple stroke, internal combustion engine having a crankshaft which rotates in response to motion by a piston in a cylinder of the engine, said method comprising the steps of:

radiating a radio frequency wave into a combustion chamber defined by the piston and the cylinder;

radiating an ignition signal into the combustion chamber to ignite an air-fuel mixture in the combustion chamber, the piston in the cylinder being urged through at least two consecutive strokes including the compression stroke to excite at least one resonance of the wave having the same mode in the chamber during each stroke;

detecting the reflected analog radio frequency signal and ignition signal occurring during the motion of the piston;

generating a timing signal corresponding to crankshaft rotation;

converting the analog radio frequency signal and ignition signal to a plurality of digital signals related to the amplitudes of the radio frequency signals and the ignition signal and the frequency of the timing signal;

calculating the locations of the resonances and the ignition signal from the digital signals with respect to the angle of the crankshaft;

correlating the calculated locations to determine the amount of crankshaft rotation between the location of the ignition signal and the location of the compression resonance closest the location of the ignition signal.

37. The method as claimed in claim 36 including the step of further correlating the amount of crankshaft rotation between the ignition signal and the closest resonance with a reference amount of crankshaft rotation to determine the diagnostic condition.

38. The method as claimed in claim 37 wherein said diagnostic condition comprises ignition timing.

39. A method for providing diagnostic information related to a diagnostic condition in a multiple stroke, internal combustion engine having a crankshaft which rotates in response to motion by a piston in a cylinder of the engine, said method comprising the steps of:

radiating a radio frequency wave into a combustion chamber defined by the piston and the cylinder;

radiating an ignition signal into the combustion chamber during the compression stroke of at least one cycle to ignite the air-fuel mixture in the combustion chamber to, in turn, urge the piston in the cylinder through at least the compression and power strokes, at least one resonance of the wave in the chamber being excited during each stroke;

detecting the reflected analog radio frequency signal and ignition signal occurring during the motion of the piston;

generating a timing signal corresponding to crankshaft rotation;

converting the analog radio frequency signal and ingnition signal to a plurality of digital signals related to the amplitudes of the radio frequency signal and the ignition signal and the frequency of the timing signal;

calculating the location of the resonance from the digital signals with respect to the angle of the crankshaft;

calculating the quality factor of the resonance from the digital signals; and correlating the calculated quality factor with a reference quality factor of the same resonance to determine the diagnostic condition.

40. The method as claimed in claim 39 wherein said resonance occurs prior to the ignition signal and wherein the diagnostic condition comprises the amount of pre-ignition.

41. The method as claimed in claim 39 wherein said resonance occurs after the ignition signal and wherein the diagnostic condition comprises engine misfiring.

42. The method as claimed in claim 39 or claim 40 or claim 41 wherein the piston moves through at least two cycles and wherein said reference quality factor is calculated from the digital signals of the same resonance occurring during the second cycle.

43. Apparatus for producing diagnostic information related to a diagnostic condition in a multiple stroke, internal combustion engine having a crankshaft which rotates in response to motion by a piston in a cylinder of the engine, said apparatus comprising:

radiating means for radiating a radio frequency wave into a combustion chamber defined by the piston and the cylinder so as to excite at least one resonance of the wave in the chamber when the piston moves through one stroke;

detecting means for detecting the reflected analog radio frequency signal occurring during the motion of the piston;

generating means adapted to be coupled to the crankshaft for generating a timing signal relating to the amount of crankshaft rotation;

converting means for converting the analog radio frequency signal to a set of digital signals related to the amplitude of the radio frequency signal and the frequency of the timing signal;

first storing means for storing the set of digital signals;

second storing means for storing a second set of corresponding digital signals representing at least one parameter; and programmable calculating means coupled to said converting means, said first and second storing means and the generating means for first calculating the location of the resonance with respect to the angle of the crankshaft and the same parameter associated with the resonance from the first set of digital signals, then correlating the values of the parameters to identify the diagnostic condition, said converting means being controlled by said calculating means to convert in response to said timing signal.

44. Apparatus for providing diagnostic information related to a diagnostic condition in a multiple stroke, internal combustion engine having a crankshaft which rotates in response to motion by a piston in a cylinder of the engine, said apparatus comprising:

radiating means for radiating a radio frequency wave into a combustion chamber defined by a piston and a cylinder of the engine so as to excite at least one resonance of the wave in the chamber when the piston moves through one stroke;

detecting means for detecting the reflected analog radio frequency signal occurring during the motion of the piston;

generating means adapted to be coupled to the crankshaft for generating a timing signal related to the amount of crankshaft rotation;

converting means for converting the analog radio frequency signal to a set of digital signals related to the amplitude of the radio frequency and the frequency of the timing signal;

storing means for storing a second set of corresponding digital signals representing at least one predetermined parameter of the same resonance;

programmable calculating means coupled to said converting means and said storing means for first calculating the location of the resonance with respect to the angle of the crankshaft and the same parameter of the resonance from the first set of digital signals, then comparing the values of the parameter to identify the diagnostic information; and display means for displaying the diagnostic information.

45. A method for providing diagnostic information related to a diagnostic condition in a multiple stroke, internal combustion engine having a crankshaft which rotates in response to motion by a piston in a cylinder of the engine, said method comprising the steps of:

radiating a radio frequency wave into a combustion chamber difined by the piston and the cylinder;

exciting at least one resonance of the wave in the chamber;

detecting the reflected analog radio frequency signal occurring during the motion of the piston;

generating a timing signal corresponding to crankshaft rotation;

converting the analog radio frequency signal to a plurality of digital signals related to the amplitude of the radio frequency signal and the frequency of the timing signal;

calculating the location of the resonance from the digital signals with respect to the angle of the crankshaft;

calculating a parameter of the resonance from the digital signals; and correlating the calculated parameter with a reference of the same parameter to determine the diagnostic condition.

46. The method as claimed in claim 45 wherein said resonance comprises the rectangular-like $TE_{10N}$ mode resonance.

* * * * *

UNITED STATES PATENT AND TRADEMARK OFFICE
CERTIFICATE OF CORRECTION

PATENT NO. : 4,468,956

DATED : September 4, 1984

INVENTOR(S) : Angelo L. Merlo

It is certified that error appears in the above-identified patent and that said Letters Patent is hereby corrected as shown below:

Column 5, line 65,
 in the equation $\text{Sin}$ should be $\overline{\text{Sin}\theta}$ Column 6, line 18,
 omit [where x=z-H=B  -H] and on the next line insert "where" before the equation Column 11, line 30,
 "Iwhich" should only read "which"

Column 17, line 15,
 $TM_{012}$ should be $TM_{011}$

Column 22, line 40, (claim 45) "difined" should be "defined".

*Signed and Sealed this*

*Twenty-third* Day of *April 1985*

[SEAL]

*Attest:*

DONALD J. QUIGG

*Attesting Officer*   *Acting Commissioner of Patents and Trademarks*